United States Patent
Choi et al.

(10) Patent No.: US 9,538,162 B2
(45) Date of Patent: Jan. 3, 2017

(54) SYNTHESIS SYSTEM OF TIME-OF-FLIGHT CAMERA AND STEREO CAMERA FOR RELIABLE WIDE RANGE DEPTH ACQUISITION AND METHOD THEREFOR

(71) Applicant: SAMSUNG ELECTRONICS CO., LTD., Suwon-si (KR)

(72) Inventors: Ouk Choi, Yongin-si (KR); Seung Kyu Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 246 days.

(21) Appl. No.: 13/780,555

(22) Filed: Feb. 28, 2013

(65) Prior Publication Data
US 2013/0222550 A1    Aug. 29, 2013

(30) Foreign Application Priority Data
Feb. 29, 2012  (KR) .................. 10-2012-0021462

(51) Int. Cl.
*H04N 13/02*       (2006.01)
*G06T 7/00*        (2006.01)
*G01S 17/02*       (2006.01)
*G01S 17/36*       (2006.01)
*G01S 17/89*       (2006.01)

(52) U.S. Cl.
CPC ........... *H04N 13/025* (2013.01); *G01S 17/023* (2013.01); *G01S 17/36* (2013.01); *G01S 17/89* (2013.01); *G06T 7/0075* (2013.01); *H04N 13/0257* (2013.01); *H04N 13/0271* (2013.01)

(58) Field of Classification Search
CPC ..................... H04N 13/0239; H04N 13/025
USPC ........................ 348/42–60; 382/154
See application file for complete search history.

(56) References Cited

U.S. PATENT DOCUMENTS

| | | | |
|---|---|---|---|
| 2009/0201384 A1* | 8/2009 | Kang et al. ............... | 348/222.1 |
| 2011/0305370 A1* | 12/2011 | Choi et al. ................ | 382/106 |
| 2012/0056982 A1* | 3/2012 | Katz et al. ................ | 348/43 |
| 2012/0082346 A1* | 4/2012 | Katz et al. ................ | 382/106 |

(Continued)

FOREIGN PATENT DOCUMENTS

| | | |
|---|---|---|
| EP | 2395475 A1 | 12/2011 |
| JP | 2008-116308 | 5/2008 |

(Continued)

OTHER PUBLICATIONS

Zhu, Jiejie, et al. "Fusion of Time-of-Flight Depth and Stereo for High Accuracy Depth Maps," IEEE. 2008.*

(Continued)

*Primary Examiner* — Farzana Hossain
(74) *Attorney, Agent, or Firm* — Harness, Dickey & Pierce, P.L.C.

(57) ABSTRACT

Provided is a synthesis system of a time-of-flight (ToF) camera and a stereo camera for reliable wide range depth acquisition and a method therefor. The synthesis system may estimate an error per pixel of a depth image, may calculate a value of a maximum distance multiple per pixel of the depth image using the error per pixel of the depth image, a left color image, and a right color image, and may generate a reconstructed depth image by conducting phase unwrapping on the depth image using the value of the maximum distance multiple per pixel of the depth image.

20 Claims, 11 Drawing Sheets

(56) References Cited

U.S. PATENT DOCUMENTS

2012/0162386 A1* 6/2012 Kim et al. .............. 348/47
2013/0136338 A1* 5/2013 Asente .............. G06K 9/46
　　　　　　　　　　　　　　　　　　　382/154

FOREIGN PATENT DOCUMENTS

| JP | 2008-116309 | 5/2008 |
| JP | 2009-47496 | 3/2009 |
| JP | 2009-47498 | 3/2009 |
| JP | 2009-139995 | 6/2009 |
| KR | 10-2005-0058085 | 6/2005 |
| KR | 10-2010-0087685 | 8/2010 |
| KR | 10-2011-0136016 | 12/2011 |
| KR | 10-2012-0007043 | 1/2012 |

OTHER PUBLICATIONS

Droeschel, David, et al. "Multi-frequency Phase Unwrapping for Time of Flight Cameras," In Proceedings of IEEE/RSJ International Conference on Intelligent Robots and Systems. 2010.*

* cited by examiner

Right disparity image
Stereo

Right disparity image
ToF+Stereo

Left disparity image
Stereo

Left disparity image
ToF+Stereo

SYNTHESIS SYSTEM OF TIME-OF-FLIGHT CAMERA AND STEREO CAMERA FOR RELIABLE WIDE RANGE DEPTH ACQUISITION AND METHOD THEREFOR

CROSS-REFERENCE TO RELATED APPLICATION

This application claims the priority benefit of Korean Patent Application No. 10-2012-0021462, filed on Feb. 29, 2012, in the Korean Intellectual Property Office, the disclosure of which is incorporated herein by reference.

BACKGROUND

1. Field

Example embodiments relate to three-dimensional (3D) scene modeling, and more particularly, to a system and method for reliable wide range depth acquisition for a depth image.

2. Description of the Related Art

A Time-of-Flight (ToF) camera, a type of depth camera, has an advantage of providing depth information of a scene in real time, and thus is being used widely for various purposes, for example, human motion tracking, object modeling, and the like.

The ToF camera includes a light emitting device to emit an infrared ray light, for example, a light emitting diode (LED), and a sensor to detect the light. The ToF camera allows distance calculation by measuring a travel time taken by light to return to the sensor after bouncing off an object, as represented by Equation 1.

$$r = \frac{c t_{time\text{-}of\text{-}flight}}{2} \qquad \text{[Equation 1]}$$

where r denotes a distance from an object, c denotes a speed of light, and $t_{time\text{-}of\text{-}flight}$ denotes a travel time taken by light to return to a sensor after bouncing off the object.

Measuring a $t_{time\text{-}of\text{-}flight}$ is difficult because the speed of light is exceptionally fast. To resolve this issue, $t_{time\text{-}of\text{-}flight}$ is calculated in an indirect manner of measuring the intensity of light based on at least two different phases after frequency-modulated light is emitted. A further detailed description is provided with reference to FIG. 1.

SUMMARY

The foregoing and/or other aspects are achieved by providing a method for reliable wide range depth acquisition in a synthesis system of time-of-flight(ToF) camera and stereo camera, the method including receiving a depth image taken with a ToF camera and a left color image and a right color image taken with a stereo camera, estimating an error per pixel of the depth image, calculating a value of a maximum distance multiple per pixel of the depth image using the error per pixel of the depth image, the left color image, and the right color image, and generating a reconstructed depth image by conducting phase unwrapping on the depth image using the value of the maximum distance multiple per pixel of the depth image.

The estimating of the error per pixel of the depth image may include estimating, to be the error, a smallest standard deviation among standard deviations calculated using depths of pixels included in windows of a predetermined size.

The estimating of the error per pixel of the depth image may include generating a plane using depths of pixels included in windows of a predetermined size and calculating a standard deviation using a distance from the plane, and estimating, to be the error, a smallest standard deviation among the standard deviations of the windows calculated using the distance from the plane.

The calculating of the value of the maximum distance multiple may include calculating a color difference between a region of the left color image and a region of the right color image corresponding to a error range per pixel of the depth image per a value of the maximum distance multiple being set, and determining a value of a maximum distance multiple corresponding to a minimum color difference to be a value of a maximum distance multiple of a corresponding pixel.

The calculating of the value of the maximum distance multiple may include calculating a value of a maximum distance multiple of a pixel of the depth image to be equal to a value of a maximum distance multiple of a neighboring pixel when a difference between a vector of the corresponding pixel and a vector of the neighboring pixel is smaller than a predetermined value.

The conducting of phase unwrapping on the depth image may include conducting phase unwrapping on the depth image using the value of the maximum distance multiple per pixel of the depth image, and removing noise through median filtering.

The method may further include, pre-processing of estimating intrinsic parameters of the ToF camera and the stereo camera and extrinsic parameters indicating a correlation between the ToF camera and the stereo camera, before the images are received.

The pre-processing may include estimating the intrinsic parameters and the extrinsic parameters by comparing a plurality of the images taken with the ToF camera and the stereo camera.

The method may further include analyzing each of the left color image and the right color image to identify a distinctive region with a unique dense texture and a flat non-textured region, analyzing each of the left color image and the right color image to identify a consistent region and an inconsistent region, wherein the consistent region refers to a region existing in two images of the stereo image pair corresponding to the left color image and the right color image, and the inconsistent region refers to a region existing in one image of the stereo image pair, stereo matching, when a region of interest corresponds to a distinctive region and a consistent region, to estimate a disparity value per pixel of the distinctive and consistent region by comparing the left color image to the right color image, stereo matching, when a region of interest corresponds to a distinctive region and an inconsistent region, to estimate a disparity value per pixel of the distinctive and inconsistent region using the reconstructed depth image, and generating a left disparity image and a right disparity image using the estimated disparity values.

The stereo matching of estimating the disparity value per pixel of the distinctive and inconsistent region may include projecting a depth per pixel of the reconstructed depth image corresponding to the distinctive and consistent region onto the left color image and the right color image taking a error range per pixel of the reconstructed depth image into consideration, and estimating, to be a disparity value of a corresponding pixel, a smallest disparity value to within a range of projection onto the left color image and the right color image.

The method may further include, after generating of the left disparity image and the right disparity image, correcting the reconstructed depth image using the left disparity image and the right disparity image.

The correcting of the reconstructed depth image may include analyzing each of the left disparity image and the right disparity image to identify a consistent region and an inconsistent region, wherein the consistent region refers to a region existing in two images of the disparity image pair corresponding to the left disparity image and the right disparity image, and the inconsistent region refers to a region existing in one image of the disparity image pair, and correcting the depth of the corresponding region of the reconstructed depth image using a disparity value of the consistent region in the left disparity image and the right disparity image.

The foregoing and/or other aspects are also achieved by providing a synthesis system of time-of-flight(ToF) camera and stereo camera including a ToF camera configured to acquire a depth image using a time that light takes to travel back after bouncing off an object, a stereo camera configured to acquire a left color image and a right color image for a three-dimensional (3D) image, an error estimating unit configured to estimate an error per pixel of the depth image, and a phase unwrapping unit configured to calculate a value of a maximum distance multiple per pixel of the depth image using the error per pixel of the depth image, the left color image, and the right color image, and to generate a reconstructed depth image by conducting phase unwrapping on the depth image using the value of the maximum distance multiple per pixel of the depth image.

The phase unwrapping unit may be configured to calculate a color difference between a region of the left color image and a region of the right color image corresponding to a error range per pixel of the depth image by value of the maximum distance multiple being set, and to determine a value of a maximum distance multiple corresponding to a minimum to color difference to be a value of a maximum distance multiple of a corresponding pixel.

The phase unwrapping unit may be configured to calculate a value of maximum distance multiple of a pixel of the depth image to be equal to a value of a maximum distance multiple of a neighboring pixel when a difference between a vector of the corresponding pixel and a vector of the neighboring pixel is smaller than a predetermined value.

The synthesis system may further include a pre-processing unit configured to estimate intrinsic parameters of the ToF camera and the stereo camera and extrinsic parameters indicating a correlation between the ToF camera and the stereo camera.

The synthesis system may further include an image analysis unit configured to analyze each of the left color image and the right color image to identify a distinctive region with a unique dense texture and a flat non-textured region, and to analyze each of the left color image and the right color image to identify a consistent region and an inconsistent region, wherein the consistent region refers to a region existing in two images of the stereo image pair corresponding to the left color image and the right color image, and the inconsistent region refers to a region existing in one image of the stereo image pair, and a stereo matching unit configured to estimate, when a region of interest corresponds to a distinctive region and a consistent region, a disparity value per pixel of the distinctive and consistent region by comparing the left color image to the right color image, to estimate, when a region of interest corresponds to a distinctive region and an inconsistent region, a disparity value per pixel of the distinctive and inconsistent region using the reconstructed depth image, and to generate a left disparity image and a right disparity image using the estimated disparity values.

The stereo matching unit may be configured to estimate the disparity value per pixel of the distinctive and inconsistent region by projecting a depth per pixel of the reconstructed depth image corresponding to the distinctive and consistent region onto the left color image and the right color image taking a error range per pixel of the reconstructed depth image into to consideration, and by estimating, to be a disparity value of a corresponding pixel, a smallest disparity value within a range of projection onto the left color image and the right color image.

The synthesis system may further include a depth image correcting unit configured to analyze each of the left disparity image and the right disparity image to identify a consistent region and an inconsistent region, wherein the consistent region refers to a region existing in two images of the disparity image pair corresponding to the left disparity image and the right disparity image, and the inconsistent region refers to a region existing in one image of the disparity image pair, and to correct the depth of the corresponding region of the reconstructed depth image using a disparity value of the consistent region in the left disparity image and the right disparity image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
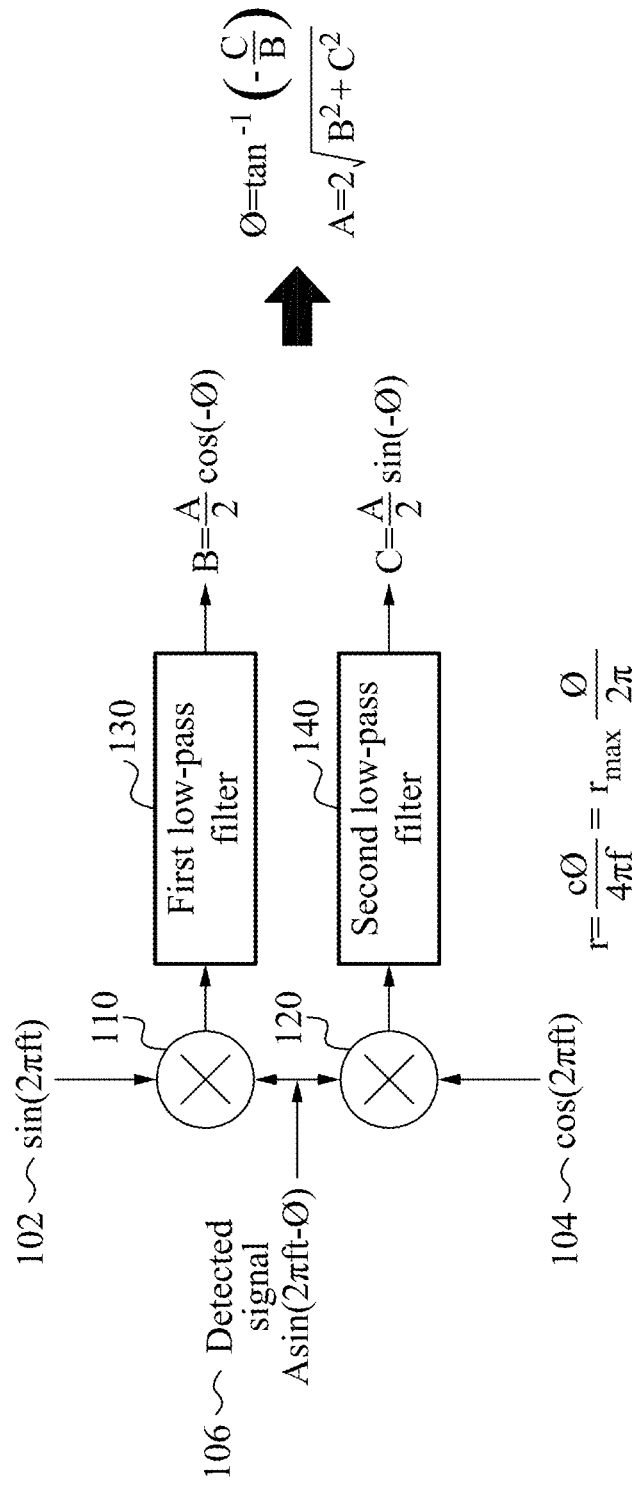
FIG. 1 illustrates an apparatus for measuring a distance using reflected light according to a related art.

Reference will now be made in detail to embodiments, examples of which are illustrated in the accompanying drawings, wherein like reference numerals refer to the like elements throughout. Embodiments are described below to explain the present disclosure to by referring to the figures.

FIG. 1 illustrates an apparatus for measuring a distance using reflected light according to a related art.

Referring to FIG. 1, the apparatus includes a first mixer 110, a second mixer 120, a first low-pass filter 130, and a second low-pass filter 140.

The first mixer 110 mixes frequency-modulated radiated light 102 with reflected light 106, and provides the mixed light to the first low-pass filter 130.

The second mixer 120 mixes radiated light having a different phase from the radiated light 102 with the reflected light 106, and provides the mixed light to the second low-pass filter 140.

The first low-pass filter 130 and the second low-pass filter 140 filter and output the received signals.

The signals output from the first low-pass filter 130 and the second low-pass filter 140 may be represented by Equation 2.

$$\phi = \tan^{-1}\left(-\frac{C}{B}\right)$$ [Equation 2]

$$A = 2\sqrt{B^2 + C^2}$$

Equation 3 may be induced using Equation 2, the radiated light 102, and the reflected light 106.

$$r = \frac{c\phi}{4\pi f} = r_{max}\frac{\phi}{2\pi}$$ [Equation 3]

In FIG. 1, Equation 2, and Equation 3, r denotes a distance from an object φ denotes a phase difference between the radiated light and the reflected light, f denotes a frequency used for modulation, and $r_{max}$ denotes a non-ambiguous distance range or a maximum acquirable distance. $t_{time-of-flight}$ is proportional to $$\frac{\phi}{2\pi}.$$

When the phase difference is greater than 2π, the phase difference is measured as being smaller than an actual phase difference, for example, in a range between 0 and 2π. For accurate distance calculation, calculating $r+nr_{max}$ using φ+2πn is necessary, wherein φ denotes a measured phase difference, and n denotes an integer having a value of 0 or more, and in the present disclosure, is referred to as a value of a maximum distance multiple. A method of measuring a distance using a current commercial ToF camera fails to determine a value of n. Accordingly, a maximum acquirable distance is limited to $r_{max}$. For an object placed at a distance greater than $r_{max}$, an incorrect result being less than an actual distance value is produced.

Figure 2:
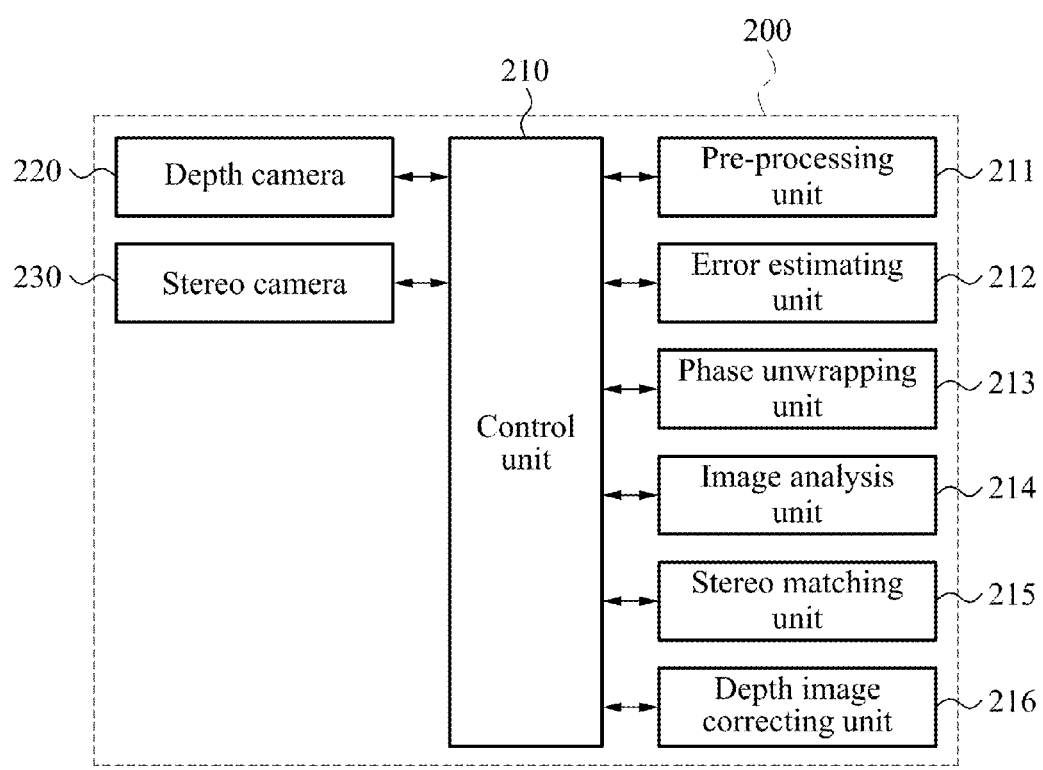
FIG. 2 illustrates an example of a synthesis system of time-of-flight(ToF) camera and stereo camera according to an exemplary embodiment.

FIG. 2 illustrates a synthesis system of time-of-flight (ToF) camera and stereo camera 200 according to an exemplary embodiment.

Referring to FIG. 2, the synthesis system of time-of-flight (ToF) camera and stereo camera 200 may include a control unit 210, a depth camera 220, a stereo camera 230, a pre-processing unit 211, an error estimating unit 212, a phase unwrapping unit 213, an image analysis unit 214, a stereo matching unit 215, and a depth image correcting unit 216.

The depth camera 220 may acquire a depth image using a time that light takes to travel back after bouncing off an object.

The stereo camera 230 may acquire a left color image and a right color image for a three-dimensional (3D) image.

Hereinafter, a further detailed description is provided with reference to FIG. 5.

Figure 5A:
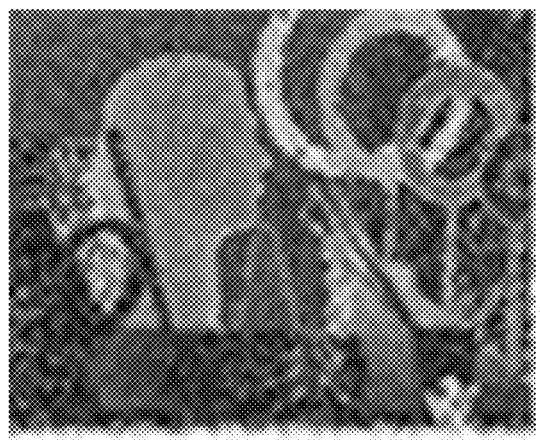
FIGS. 5A through 5C illustrate examples of images taken with a ToF camera and a stereo camera according to an exemplary embodiment.
Figure 5B:
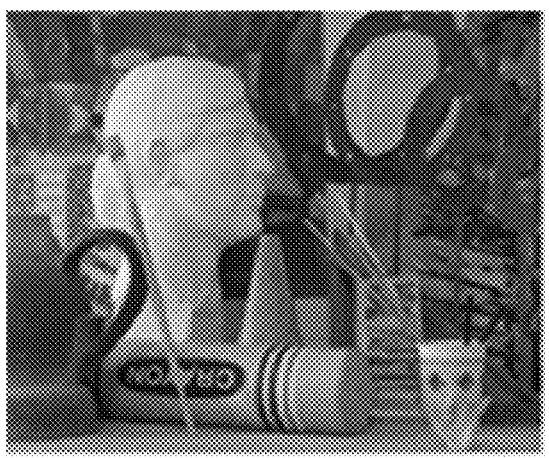
Figure 5C:
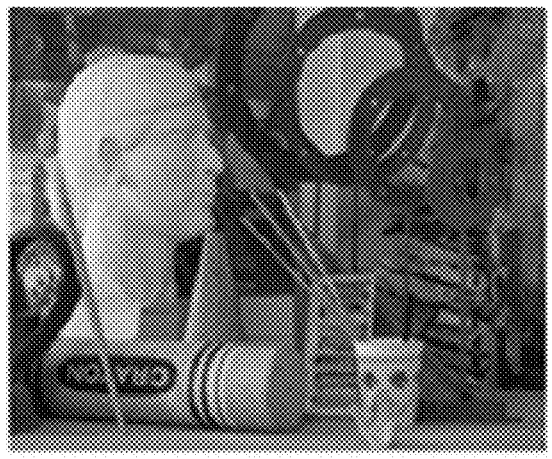

FIGS. 5A through 5C illustrate examples of images taken with the ToF camera 220 and the stereo camera 230 according to an exemplary embodiment.

In FIG. 5A, a depth image taken with the depth camera 220 (i.e. ToF camera) is illustrated. In FIG. 5B, a left color image taken with a left camera of the stereo camera 230 is illustrated. In FIG. 5C, a right color image taken with a right camera of the stereo camera 230 is illustrated.

The pre-processing unit 211 may estimate an intrinsic parameter for each of the depth camera 220 and the stereo camera 230 using the images taken with the depth camera 220 and the stereo camera 230 and an extrinsic parameter indicating a correlation between the depth camera 220 and the stereo camera 230. A further detailed description of pre-processing is provided with reference to FIG. 4.

Figure 4:
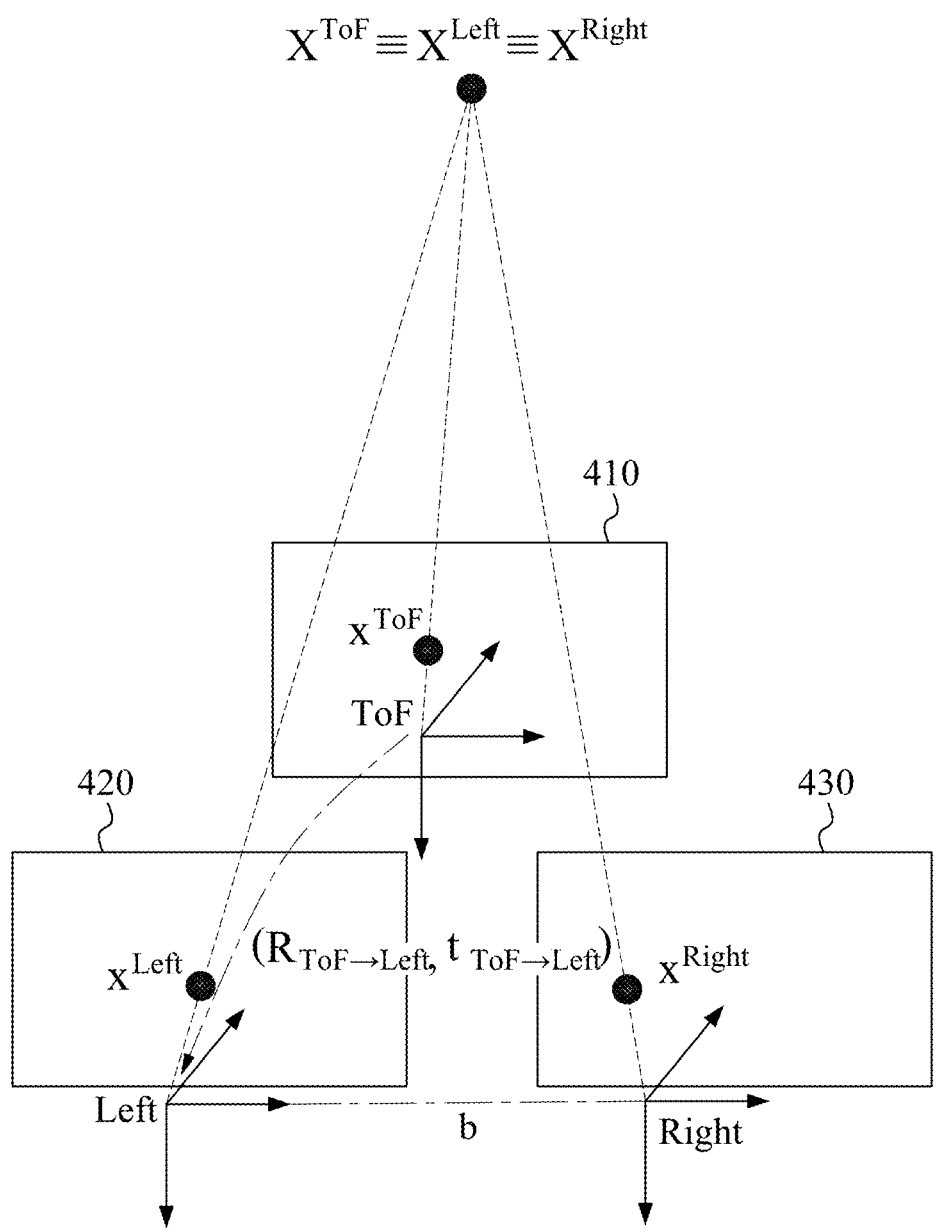
FIG. 4 illustrates an example of pre-processing of a synthesis system of time-of-flight to (ToF) camera and stereo camera according to an exemplary embodiment.

FIG. 4 illustrates an example of pre-processing of the synthesis system of time-of-flight (ToF) camera and stereo camera according to an exemplary embodiment.

Referring to FIG. 4, a 3D point $X^{ToF}$ on a camera coordinate system measured at a pixel $x^{ToF}$ of the depth image may be transformed into a corresponding point $X^{Left}$ on a camera coordinate system of the left color image and a corresponding point $X^{Right}$ on a camera coordinate system of the right color image.

The coordinate transformation is expressed as Equation 4.

Extrinsic Parameters [Equation 4]

$$X^{Left} = R_{ToF \to Left} X^{ToF} + t_{ToF \to Left}$$

$$X^{Right} = X^{Left} - b = X^{Left} - \begin{bmatrix} b \\ 0 \\ 0 \end{bmatrix}$$

Intrinsic Parameters $$x^{Left} \propto KX^{Left} = \begin{bmatrix} f & & x_c \\ & f & y_c \\ & & 1 \end{bmatrix} X^{Left}$$

$$x^{Right} \propto KX^{Right} = \begin{bmatrix} f & & x_c \\ & f & y_c \\ & & 1 \end{bmatrix} X^{Right}$$

where intrinsic parameters correspond to (f, $x_c$, $y_c$), extrinsic parameters correspond to ($R_{ToF \to Left}$, $t_{ToF \to Left}$, b), f denotes a focal length, $x_c$ denotes a center of an x-axis in an image, $y_c$ denotes a center of a y-axis in the image, $R_{ToF=Left}$ denotes a magnitude of rotation about a coordinate axis, $t_{ToF \to Left}$ denotes a magnitude of translation along the coordinate axis, and b denotes a baseline distance. Here, since stereo camera calibration is taken into consideration, an extrinsic parameter of the left camera and the right camera is represented by b. However, when stereo camera calibration is excluded from consideration, the extrinsic parameters may be given by a rotation matrix and translation vector.

By the pre-processing unit 211 estimating the intrinsic parameters and the extrinsic parameters based on Equation 4, the phase unwrapping unit 213, the stereo matching unit 215, and the depth image correcting unit 216 may estimate $X^{Left}$ or $X^{Right}$ corresponding to $X^{ToF}$ when projected onto the stereo images.

The error estimating unit 212 may estimate an error for each pixel of the depth image.

The error estimating unit 212 may estimate, to be the error, a smallest standard deviation among standard deviations calculated using depths of pixels of the depth image included in each window of a predetermined size.

According to another embodiment, the error estimating unit 212 may generate an object plane using depths of pixels included in each window of a predetermined size in the depth image, and may calculate a standard deviation using a distance from the plane to each window. The error estimating unit 212 may estimate, to be an error, a smallest standard deviation among the standard deviations of the windows calculated using the distance from the plane.

The phase unwrapping unit 213 may calculate a value of a maximum distance multiple for each pixel of the depth image using the error per pixel of the depth image, the left color image, and the right color image, and may conduct phase unwrapping using the calculated value of the maximum distance multiple for each pixel of the depth image, to generate a reconstructed depth image. Wide range depth acquisition means the phase unwrapping of the depth image. Phase unwrapped depth image means the reconstructed depth image.

The phase unwrapping unit 213 may calculate a color difference between a region of the left color image and a region of the right color image corresponding to a error range per pixel of the depth image for each value of a maximum distance multiple being set, and may determine a value of the maximum distance multiple corresponding to a minimum color difference to be a value of a maximum distance multiple of a corresponding pixel. The determined value of the maximum distance multiple may be used as a factor for cost function.

Figure 6:
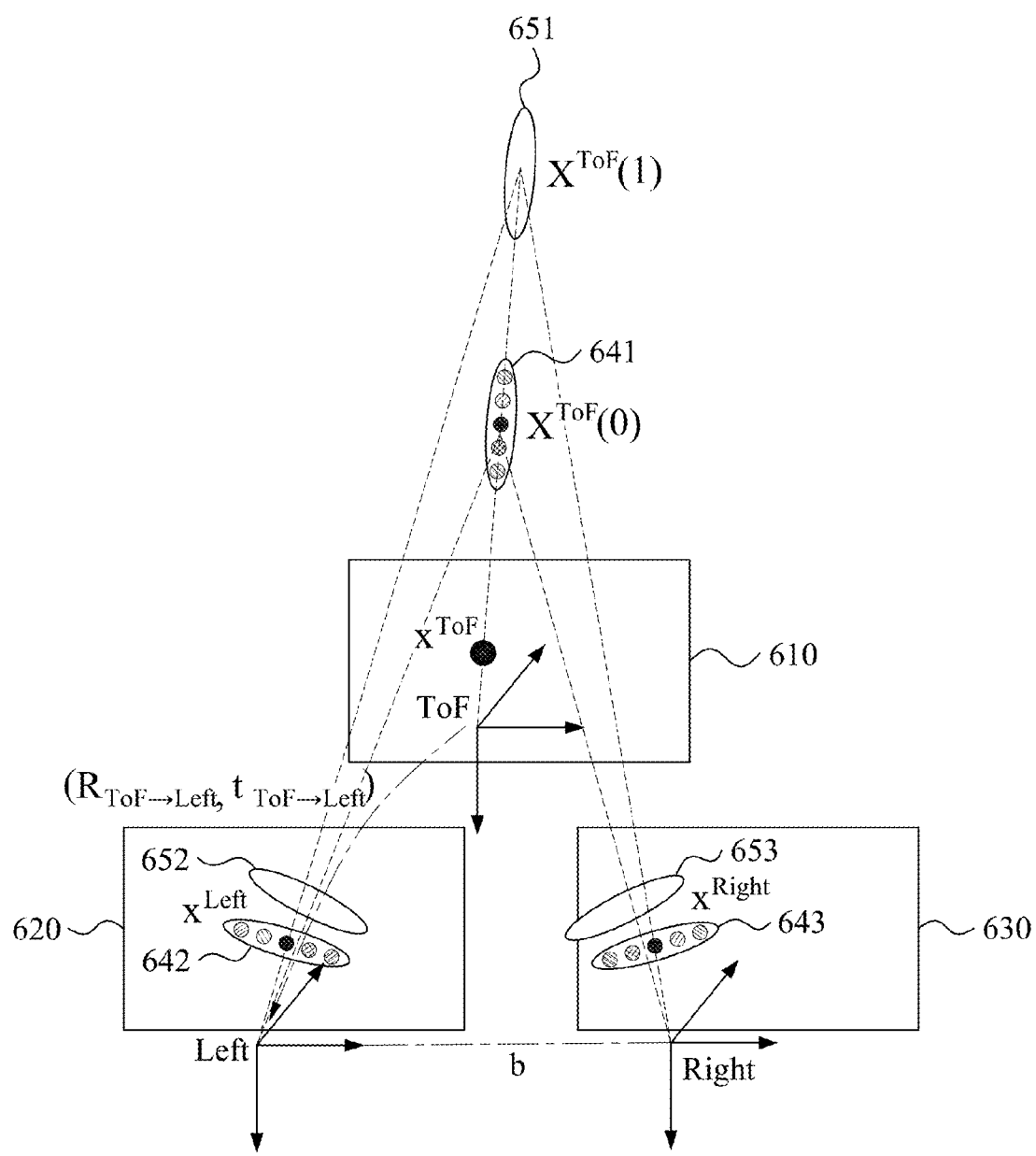
FIG. 6 illustrates an example of projecting a depth of the depth image onto a left color image and a right color image taking into consideration an error range per pixel of the depth image for each a value of a maximum distance multiple in a synthesis system of time-of-flight(ToF) camera and stereo camera according to an exemplary embodiment.

FIG. 6 illustrates an example of projecting a depth of the depth image onto a left color image and a right color image taking into consideration an error range per pixel of the depth image for each a value of a maximum distance multiple in a synthesis system of time-of-flight (ToF) camera and stereo camera according to an exemplary embodiment.

Referring to FIG. 6, the phase unwrapping unit 213 may calculate color differences between regions 642 and 652 of a left color image 620 and regions 643 and 653 of a right color image 630 corresponding to error range per pixel 641 and 651 of the depth image for each value of a maximum distance multiple (0, 1), and may determine a value of the maximum distance multiple corresponding to a minimum color difference to be a value of a maximum distance multiple of a corresponding pixel. The determined value of the maximum distance multiple may be used as a factor for cost function.

When a difference between a vector of a corresponding pixel in the depth image and a vector of a neighboring pixel of the corresponding pixel is smaller than a predetermined value, the phase unwrapping unit 213 may calculate a value of the maximum distance multiple of the corresponding pixel to be equal to that of the neighboring pixel. The calculated value of the maximum distance multiple may be used as a factor for cost function.

The phase unwrapping unit 213 may determine a value of n for minimizing a cost function value E in Equation 5 to be the value of the maximum distance multiple.

$$E = \sum_{i \in P} C_i(n_i) + \lambda \sum_{(i,j) \in N} U(n_i, n_j) \quad \text{[Equation 5]}$$

$$C_i(n_i) = \min_{X \in \{X_i^{ToF}(n_i) - k\sigma_i u_i, \ldots, X_i^{ToF}(n_i) + k\sigma_i u_i\}} (dissim(x_{Left}, x_{Right}))$$

$$U(n_i, n_j) = \begin{cases} \exp(-\beta \|X_i^{ToF} - X_j^{ToF}\|^2), & \text{if } \|X_i^{ToF} - X_i^{ToF}\| < \tau, n_i \neq n_j \\ 0, & \text{otherwise} \end{cases}$$

$$\beta = \frac{1}{2\langle \|X_i^{ToF} - X_j^{ToF}\|^2 \rangle}$$

where $n_i$ denotes a multiple of a maximum distance of an i-th pixel in a depth image, j denotes a neighboring pixel of the i-th pixel, $X_i^{ToF}$ denotes a vector of the i-th pixel, $C_i(n_i)$ denotes a cost function using a region of a left color image and a region of a right color image, $U(n_i, n_j)$ denotes a cost function using neighboring pixels of a corresponding pixel in the depth image, λ denotes a weight value for adjusting a relative significance of and $C_i(n_i)$ and $U(n_i, n_j)$, N denotes a collection of all neighboring pixels in the depth image, P denotes a collection of all pixels in the depth image, $\sigma_i$ denotes an error of the i-th pixel, k denotes a confidence interval of a probability distribution, τ denotes a threshold for determining similarity between vectors of neighboring pixels in the depth image, and dissim($x_{Left}$, $x_{Right}$) denotes a difference in intensity or texture between $x_{Left}$ and $x_{Right}$ corresponding to a point X when projected onto the left color image and the right color image.

The phase unwrapping unit 213 may conduct phase unwrapping on the depth image using the value of the maximum distance multiple for each pixel of the depth image, and may remove noise through median filtering.

Figure 7A:
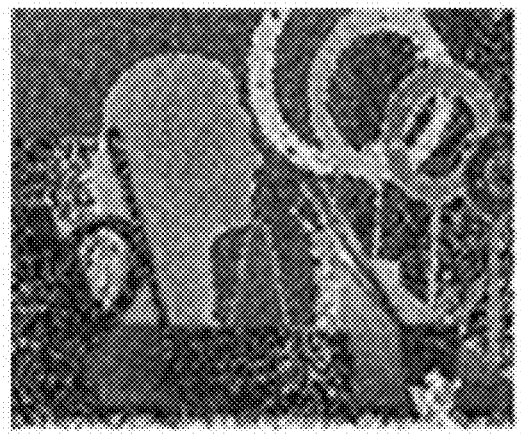
FIGS. 7A through 7C illustrate examples of unwrapped depth in a synthesis system of time-of-flight (ToF) camera and stereo camera according to an exemplary embodiment.
Figure 7B:
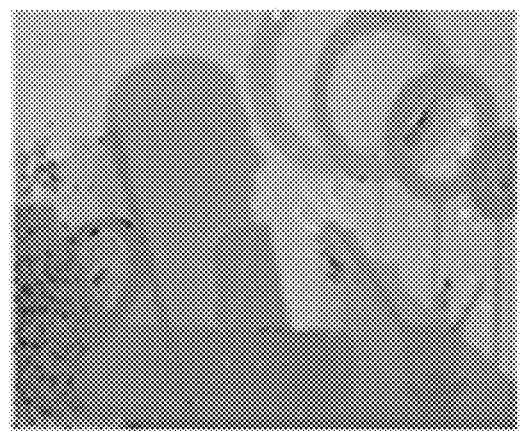
Figure 7C:
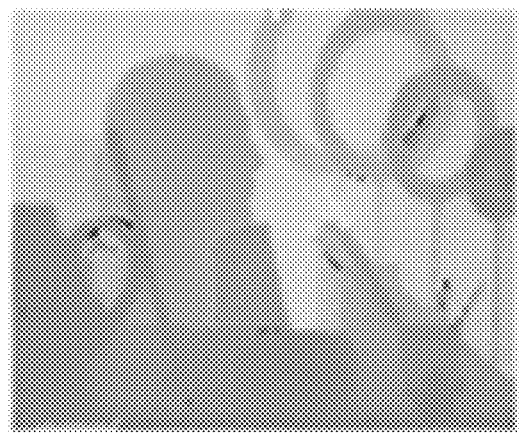

FIGS. 7A through 7C illustrate examples of unwrapped depth in the synthesis system of time-of-flight (ToF) camera and stereo camera according to an exemplary embodiment.

In FIG. 7A, an unwrapped depth image is illustrated. In FIG. 7B, a depth image obtained through phase unwrapping by the phase unwrapping unit 213 is illustrated. In FIG. 7C, a depth image obtained through phase unwrapping and median filtering is illustrated.

Referring to FIGS. 7A through 7C, depth information of the wrapped depth image of FIG. 7A may be determined to be recovered through phase unwrapping in the depth image of FIG. 7B. Also, noise present in the depth image of FIG. 7B may be determined to be removed through median filtering in the depth image of FIG. 7C.

The image analysis unit 214 may analyze each of the left color image and the right color image to identify a distinctive region with a unique dense texture and a flat non-textured region.

Stereo matching may provide a reliable result for the distinctive region with the unique dense texture. For the distinctive region, a satisfactory result may be obtained through stereo matching alone, absent cooperation of the depth image.

Figure 8A:
FIGS. 8A and 8B illustrate examples of distinctive regions identified through image analysis of a synthesis system of time-of-flight (ToF) camera and stereo camera according to an exemplary embodiment.
Figure 8B:

FIGS. 8A and 8B illustrate examples of the distinctive regions identified through image analysis of the synthesis system of time-of-flight (ToF) camera and stereo camera according to an exemplary embodiment.

In FIG. 8A, an image displaying a distinctive region and a flat region identified through analysis of the image of FIG. 5B is illustrated. In FIG. 8B, an image displaying a distinctive region and a flat region identified through analysis of the image of FIG. 5C is illustrated.

Referring to FIGS. 8A and 8B, a region displayed in white may correspond to a distinctive region with a unique dense texture, and a region displayed in black may correspond to a flat non-textured region.

Also, the image analysis unit 214 may analyze each of the left color image and the right color image to identify a consistent region and an inconsistent region. The consistent region may refer to a region existing in two images of the stereo image pair corresponding to the left color image and the right color image, and the inconsistent region may refer to a region existing in one image of the stereo image pair.

Figure 9A:
FIGS. 9A and 9B illustrate examples of inconsistent regions in stereo images identified through image analysis of a synthesis system of time-of-flight (ToF) camera and stereo camera according to an exemplary embodiment.
Figure 9B:

FIGS. 9A and 9B illustrate examples of the inconsistent regions in the stereo images identified through image analysis of the synthesis system of time-of-flight (ToF) camera and stereo camera according to an exemplary embodiment.

In FIG. 9A, an image displaying a consistent region and an inconsistent region identified through analysis of the image of FIG. 5B is illustrated. In FIG. 9B, an image displaying a consistent region and an inconsistent region identified through analysis of the image of FIG. 5C is illustrated.

Referring to FIGS. 9A and 9B, a region being displayed in white may correspond to a consistent region existing in two images of the stereo image pair, and a region being displayed in black may correspond to an inconsistent region existing in one image of the stereo image pair.

When a region of interest is determined to be a distinctive region and a consistent region using the result of an analysis performed by the image analysis unit 214, the stereo matching unit 215 may estimate a disparity value for each pixel of the distinctive and consistent region using general stereo matching scheme.

The stereo matching unit 215 may estimate a disparity value for minimizing a cost function for the left color image and the right color image based on a Markov random field using stereo matching as represented by Equation 6.

$$F^{Left} = \sum_{i \in L} \overline{D}_i^{Left}(d_i) + \eta \sum_{(i,j) \in N} V(d_i, d_j) = \qquad \text{[Equation 6]}$$

$$\sum_{i \in L} \sum_{k \in W_i} w_{i,k} D_k^{Left}(d_i) + \eta \sum_{(i,j) \in N} V(d_i, d_j)$$

$$F^{Right} = \sum_{i \in R} \overline{D}_i^{Right}(d_i) + \eta \sum_{(i,j) \in N} V(d_i, d_j) =$$

$$\sum_{i \in R} \sum_{k \in W_i} w_{i,k} D_k^{Right}(d_i) + \eta \sum_{(i,j) \in N} V(d_i, d_j)$$

where $F^{Left}$ denotes a cost function for estimating a disparity value of the left color image, $F^{Right}$ denotes a cost function for estimating a disparity value of the right color image, i, j, and k each denotes a pixel of the left color image or the right color image, d denotes a disparity value per pixel, $W_i$ denotes a window area centered at the pixel i, $w_{i,k}$ denotes a weight value for data cost aggregation, V denotes a cost for similarity between the disparity value of the pixel i and the disparity value of the pixel j, and η denotes a constant for balancing between D and V.

When a region of interest is determined to be a distinctive region and an inconsistent region, the stereo matching unit 215 may estimate a disparity value for each pixel of the distinctive and inconsistent region using the reconstructed depth image generated by the phase unwrapping unit 213, and may generate a left disparity image and a right disparity image using the estimated disparity values.

To estimate the disparity value for each pixel of the distinctive and inconsistent region, the stereo matching unit 215 may project a depth per pixel of the reconstructed depth image corresponding to the distinctive and consistent region onto the left color image and the right color image taking an error range per pixel of the reconstructed depth image into consideration, and may estimate, to be a disparity value of a corresponding pixel, a smallest disparity value within a range of projection onto each of the left color image and the right color image.

FIGS. 10A through 10D illustrate examples of disparity images generated through the synthesis system of time-of-flight (ToF) camera and stereo camera according to an exemplary embodiment and disparity images generated through general stereo matching scheme alone.

Figure 10B:
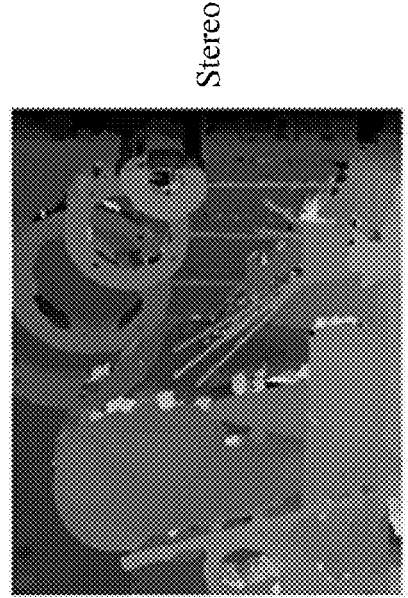
FIGS. 10A through 10D illustrate examples of disparity images generated through synthesis system of time-of-flight (ToF) camera and stereo camera according to an exemplary embodiment and disparity images generated through stereo matching alone.
Figure 10D:
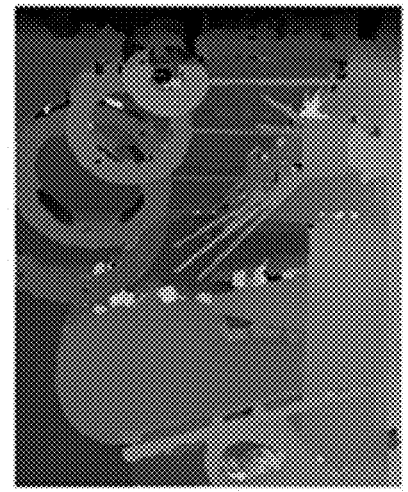
Figure 10A:
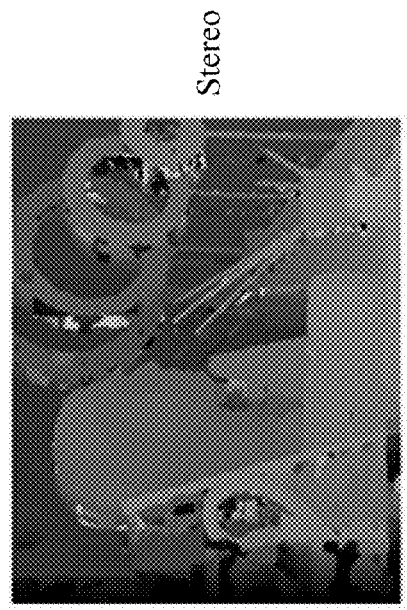
Figure 10C:
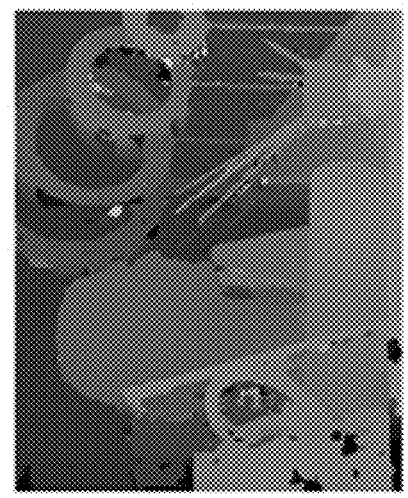

In FIG. 10A, a left disparity image generated using only general stereo matching scheme is illustrated. In FIG. 10B, a right disparity image generated using only general stereo matching scheme is illustrated. In FIG. 10C, a left disparity image generated through stereo matching using a reconstructed depth image according to an exemplary embodiment is illustrated. In FIG. 10D, a right disparity image generated through stereo matching using a reconstructed depth image according to an exemplary embodiment is illustrated.

Referring to FIGS. 10A through 10D, a correct result may be produced for a region in which accurate matching is difficult to be ensured according to an exemplary embodiment, when compared to only a general stereo matching scheme being used.

The depth image correcting unit 216 may analyze each of the left disparity image and the right disparity image to identify a consistent region and an inconsistent region, and may correct the depth of the corresponding region of the reconstructed depth image using a disparity value of the consistent region in the left disparity image and the right disparity image. Here, the consistent region refers to a region in which two images of the disparity image pair corresponding to the left disparity image and the right disparity image exist and the inconsistent region refers to a region in which one image of the disparity image pair exists.

The depth image correcting unit 216 may correct the reconstructed depth image using the left disparity image and the right disparity image. The depth image correcting unit 216 may be exterior configuration from the synthesis system of time-of-flight (ToF) camera and stereo camera 200.

Figure 11A:
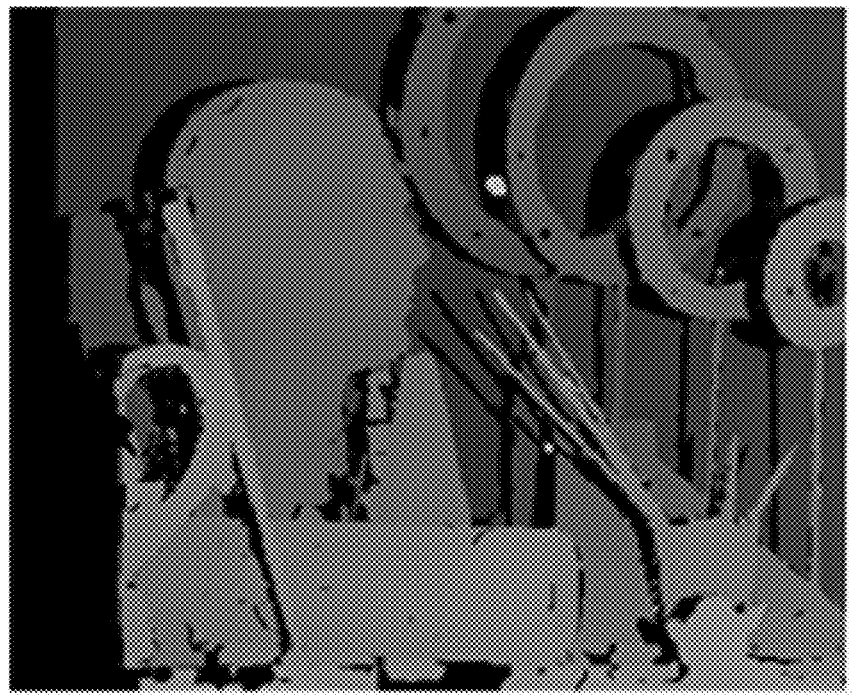
FIGS. 11A and 11B illustrate examples of inconsistent regions in stereo disparity images through analysis of a synthesis system of time-of-flight (ToF) camera and stereo camera according to an exemplary embodiment.
Figure 11B:

FIGS. 11A and 11B illustrate examples of the inconsistent regions in the stereo disparity images through analysis of the synthesis system of time-of-flight (ToF) camera and stereo camera according to an exemplary embodiment.

In FIG. 11A, an image displaying a consistent region and an inconsistent region identified through analysis of the image of FIG. 10C is illustrated. In FIG. 11B, an image displaying a consistent region and an inconsistent region identified through an analysis being performed on the image of FIG. 10D is illustrated.

Referring to FIGS. 11A and 11B, an inconsistent region, a region in which a left disparity image and a right disparity image are inconsistent, may be displayed in black, and the remaining region, for example, a consistent region, may have a normal disparity value.

The control unit 210 may control the general operation of the synthesis system of time-of-flight (ToF) camera and stereo camera 200. The control unit 210 may execute functions of the pre-processing unit 211, the error estimating unit 212, the phase unwrapping unit 213, the image analysis unit 214, the stereo matching unit 215, and the depth image correcting unit 216. Although this exemplary embodiment shows the control unit 210, the pre-processing unit 211, the error estimating unit 212, the phase unwrapping unit 213, the image analysis unit 214, the stereo matching unit 215, and the depth image correcting unit 216 separately to distinguish each function, the control unit 210 is not limited to such a configuration. For example, the control unit 210 may include at least one processor configured to execute each function of the pre-processing unit 211, the error estimating unit 212, the phase unwrapping unit 213, the image analysis unit 214, the stereo matching unit 215, and the depth image correcting unit 216. The control unit 210 may include at least one processor configured to execute a portion of each function of the pre-processing unit 211, the error estimating unit 212, the phase unwrapping unit 213, the image analysis unit 214, the stereo matching unit 215, and the depth image correcting unit 216.

Hereinafter, the phase unwrapping of the depth image and the disparity image generation in the synthesis system of time-of-flight (ToF) camera and stereo camera 200 according to an exemplary embodiment is described with reference to FIG. 3.

Figure 3:
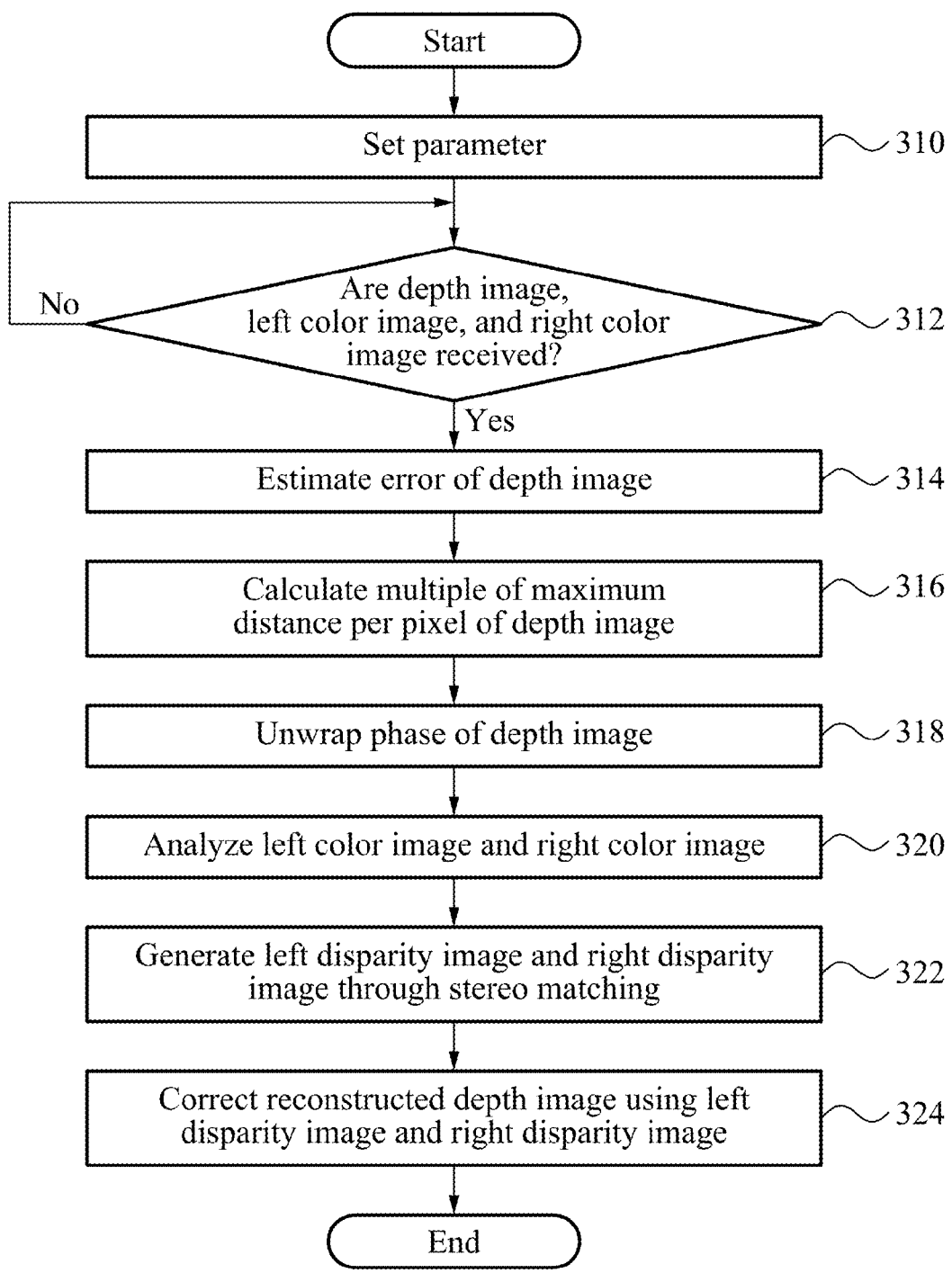
FIG. 3 is a flowchart illustrating phase unwrapping of a depth image and disparity image generation in a synthesis system of time-of-flight(ToF) camera and stereo camera according to an exemplary embodiment.

FIG. 3 is a flowchart illustrating the phase unwrapping of the depth image and the disparity image generation in the synthesis system of time-of-flight (ToF) camera and stereo camera 200 according to an exemplary embodiment.

Referring to FIG. 3, in operation 310, the ToF-stereo synthesis system 200 may estimate, through pre-processing, an intrinsic parameter for each of a depth camera (i.e. ToF camera) and a stereo camera and an extrinsic parameter indicating a correlation between the depth camera and the stereo camera.

In operation 312, the synthesis system of time-of-flight (ToF) camera and stereo camera 200 may verify whether a depth image taken with the depth camera and a left color image and a right color image taken with the stereo camera are received.

In operation 314, when it is verified that the left color image and the right color image are received in operation 312, the synthesis system of time-of-flight (ToF) camera and stereo camera 200 may estimate an error per pixel of the depth image. The synthesis system of time-of-flight (ToF) camera and stereo camera 200 may estimate, to be the error, a smallest standard deviation among standard deviations calculated using depths of pixels included in each window of a predetermined size in the depth image. According to another embodiment, the synthesis system of time-of-flight (ToF) camera and stereo camera 200 may generate an object plane using depths of pixels included in each window of a predetermined size in the depth image, may calculate a standard deviation using a distance from the plane to each window, and may estimate, to be an error, a smallest standard deviation among the standard deviations of the windows calculated using the distance from the plane.

In operation 316, the synthesis system of time-of-flight (ToF) camera and stereo camera 200 may calculate a value of a maximum distance multiple for each pixel of the depth image using the error per pixel of the depth image, the left color image, and the right color image. The the synthesis system of time-of-flight (ToF) camera and stereo camera 200 may calculate the value of the maximum distance multiple for minimizing a cost function based on Equation 5 represented in the foregoing.

In operation 318, the synthesis system of time-of-flight (ToF) camera and stereo camera 200 may generate a reconstructed depth image by conducting phase unwrapping on the depth image using the calculated value of the maximum distance multiple for each pixel of the depth image.

In operation 320, the synthesis system of time-of-flight (ToF) camera and stereo camera 200 may analyze each of the left color image and the right color image. The synthesis system of time-of-flight (ToF) camera and stereo camera 200 may identify a distinctive region with a unique dense texture and a flat non-textured region in the left color image and the right color image. Also, the synthesis system of time-of-flight (ToF) camera and stereo camera 200 may identify a consistent region and an inconsistent region in the left color image and the right color image. The consistent region may refer to a region existing in two images of the stereo image pair corresponding to the left color image and the right color image, and the inconsistent region may refer to a region existing in one image of the stereo image pair.

In operation 322, the synthesis system of time-of-flight (ToF) camera and stereo camera 200 may generate a left disparity image and a right disparity image through stereo matching. When a region of interest is determined to be a distinctive region and a consistent region, the synthesis system of time-of-flight (ToF) camera and stereo camera 200 may estimate a disparity value for each pixel of the distinctive and consistent region by comparing the left color image to the right color image. When a region of interest is determined to be a distinctive region and an inconsistent region, the synthesis system of time-of-flight (ToF) camera and stereo camera 200 may estimate a disparity value for each pixel of the distinctive and inconsistent region using the reconstructed depth image. Also, the synthesis system of time-of-flight (ToF) camera and stereo camera 200 may generate a left disparity image and a right disparity image using the estimated disparity values.

In operation 324, the synthesis system of time-of-flight (ToF) camera and stereo camera 200 may analyze each of the left disparity image and the right disparity image to identify a consistent region and an inconsistent region, the consistent region referring to a region existing in two images of the disparity image pair corresponding to the left disparity image and the right disparity image and the inconsistent region referring to a region existing in one image of the disparity image pair, and may correct the depth of the corresponding region of the reconstructed depth image using a disparity value of the consistent region in the left disparity image and the right disparity image.

According to the exemplary embodiments, synthesis system of time-of-flight (ToF) camera and stereo camera for wide range depth acquisition may reconstruct a depth image through phase unwrapping and may generate an improved stereo disparity image using the reconstructed depth image, to reconstruct a depth-of-field greater than a maximum acquirable to distance of a ToF camera even though the camera is mobile and an independently moving object is included in a scene. Also, the synthesis system of time-of-flight (ToF) camera and stereo camera may provide an improved stereo disparity image as well as a stereo color image, so that the synthesis system of time-of-flight (ToF) camera and stereo camera may be applied to 3D object modeling.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method for reliable wide range depth acquisition in a synthesis system of time-of-flight (ToF) camera and stereo camera, the method comprising:
receiving a depth image of a scene taken with a ToF camera and a left color image and a right color image of the scene taken with a stereo camera;
estimating an error per pixel of the depth image;
calculating a value of a maximum distance multiple per pixel of the depth image based on a difference between points projected onto the left color image and the right color image, the points being within an error range corresponding to the error per pixel, the value of the maximum distance multiple being indicative of a distance of an object in the scene with respect to a maximum acquirable distance of the ToF camera; and
generating a reconstructed depth image by conducting phase unwrapping on the depth image using the value of the maximum distance multiple per pixel of the depth image,
wherein the estimating of the error per pixel of the depth image includes estimating, to be the error, a smallest standard deviation among standard deviations calculated using depths of pixels included in windows of a desired size.

2. The method of claim 1, wherein the difference is a color difference between the points, and the calculating includes determining a value of a maximum distance multiple corresponding to a minimum color difference to be a value of a maximum distance multiple of a corresponding pixel.

3. The method of claim 1, wherein the calculating of the value of the maximum distance multiple comprises calculating a value of a maximum distance multiple of a pixel of the depth image to be equal to a value of a maximum distance multiple of a neighboring pixel when a difference between a vector of the corresponding pixel and a vector of the neighboring pixel is smaller than a desired value.

4. The method of claim 1, wherein the calculating of the value of the maximum distance multiple comprises determining, to be the value of maximum distance multiple, a value of 'n' for minimizing a cost function value E in Equation 7:

$$E = \sum_{i \in P} C_i(n_i) + \lambda \sum_{(i,j) \in N} U(n_i, n_j) \qquad \text{[Equation 7]}$$

$$C_i(n_i) = \min_{X \in \{X_i^{ToF}(n_j) - k\sigma_i u_i, \ldots, X_i^{ToF}(n_i) + k\sigma_i u_j\}} (dissim(x_{Left}, x_{Right}))$$

$$U(n_i, n_j) = \begin{cases} \exp(-\beta \|X_i^{ToF} - X_j^{ToF}\|^2), & \text{if } \|X_i^{ToF} - X_j^{ToF}\| < \tau, n_i \neq n_j \\ 0, & \text{otherwise} \end{cases}$$

$$\beta = \frac{1}{2\langle \|X_i^{ToF} - X_j^{ToF}\|^2 \rangle}$$

where $n_i$ denotes a value of maximum distance multiple of an i-th pixel, $\beta$ is a parameter, j denotes a neighboring pixel of the i-th pixel, $X_i^{ToF}$ denotes a vector of the i-th pixel in the depth image, $C_i(n_i)$ denotes a cost function using a region of the left color image and a region of the right color image, $U(n_i,n_j)$ denotes a cost function using neighboring pixels of a corresponding pixel in the depth image, $\lambda$ denotes a weight value for adjusting a relative significance of $C_i(n_i)$ and $U(n_i,n_j)$, N denotes a collection of all neighboring pixels in the depth image, P denotes a collection of all pixels in the depth $\sigma_i$ denotes an error of the i-th pixel, k denotes a confidence interval of a probability distribution, T denotes a threshold for determining similarity between vectors of neighboring pixels in the depth image, and $dissim(X_{Left}, X_{right})$ denotes a difference in intensity or texture between $X_{Left}$ and $X_{Right}$ corresponding to a point X when projected onto the left color image and the right color image.

5. The method of claim 1, wherein the conducting of phase unwrapping on the depth image comprises conducting phase unwrapping on the depth image using the value of the maximum distance multiple per pixel of the depth image, and removing noise through median filtering.

6. The method of claim 1, further comprising:
pre-processing of estimating intrinsic parameters of the ToF camera and the stereo camera and extrinsic parameters indicating a correlation between the ToF camera and the stereo camera, before the images are received.

7. The method of claim 6, wherein the pre-processing comprises estimating the intrinsic parameters and the extrinsic parameters by comparing a plurality of the images taken with the ToF camera and the stereo camera.

8. The method of claim 1, further comprising:
analyzing each of the left color image and the right color image to identify a distinctive region with a unique dense texture and a flat non-textured region;
analyzing each of the left color image and the right color image to identify a consistent region and an inconsistent region, wherein the consistent region refers to a region existing in two images of the stereo image pair corresponding to the left color image and the right color image, and the inconsistent region refers to a region existing in one image of the stereo image pair;
stereo matching, when a region of interest corresponds to a distinctive region and a consistent region, to estimate a disparity value per pixel of the distinctive and consistent region by comparing the left color image to the right color image;
stereo matching, when a region of interest corresponds to a distinctive region and an inconsistent region, to estimate a disparity value per pixel of the distinctive and inconsistent region using the reconstructed depth image; and
generating a left disparity image and a right disparity image using the estimated disparity values.

9. The method of claim 8, wherein the stereo matching of estimating the disparity value per pixel of the distinctive and inconsistent region comprises:
projecting a depth per pixel of the reconstructed depth image corresponding to the distinctive and consistent region onto the left color image and the right color image taking the error range per pixel of the reconstructed depth image into consideration; and
estimating, to be a disparity value of a corresponding pixel, a smallest disparity value within a range of projection onto the left color image and the right color image.

10. The method of claim 8, further comprising:
after generating of the left disparity image and the right disparity image, correcting the reconstructed depth image using the left disparity image and the right disparity image.

11. The method of claim 10, wherein the correcting of the reconstructed depth image comprises:
analyzing each of the left disparity image and the right disparity image to identify a consistent region and an inconsistent region, wherein the consistent region refers to a region existing in two images of the disparity image pair corresponding to the left disparity image and the right disparity image, and the inconsistent region refers to a region existing in one image of the disparity image pair; and
correcting the depth of the corresponding region of the reconstructed depth image using a disparity value of the consistent region in the left disparity image and the right disparity image.

12. A synthesis system of time-of-flight (ToF) camera and stereo camera comprising:
a ToF camera configured to acquire a depth image of a scene using a time that light takes to travel back after bouncing off an object;
a stereo camera configured to acquire a left color image and a right color image of the scene for a three-dimensional (3D) image;
at least one processor configured to,
estimate an error per pixel of the depth image,
calculate a value of a maximum distance multiple per pixel of the depth image based on a difference between points projected onto the left color image and the right color image, the points being within an error range corresponding to the error per pixel, the value of the maximum distance multiple being indicative of a distance of an object in the scene with respect to a maximum acquirable distance of the ToF camera, and
generate a reconstructed depth image by conducting phase unwrapping on the depth image using the value of the maximum distance multiple per pixel of the depth image,
wherein the estimating of the error per pixel of the depth image includes estimating, to be the error, a smallest standard deviation among standard deviations calculated using depths of pixels included in windows of a desired size.

13. The synthesis system of claim 12, wherein the difference is a color difference between the points, and the at least one processor is configured to calculate the value of the maximum distance multiple by determining a value of a maximum distance multiple corresponding to a minimum color difference to be a value of a maximum distance multiple of a corresponding pixel.

14. The synthesis system of claim 12, wherein the at least one processor is configured to calculate a value of maximum distance multiple of a pixel of the depth image to be equal to a value of a maximum distance multiple of a neighboring pixel when a difference between a vector of the corresponding pixel and a vector of the neighboring pixel is smaller than a desired value.

15. The synthesis system of claim 12, wherein the at least one processor is configured to determine, to be the value of maximum distance multiple, a value of n for minimizing a cost function value E in Equation 8:

$$E = \sum_{i \in P} C_i(n_i) + \lambda \sum_{(i,j) \in N} U(n_i, n_j) \quad \text{[Equation 8]}$$

$$C_i(n_i) = \min_{X \in \{X_i^{ToF}(n_i) - k\sigma_i u_i, \ldots, X_i^{ToF}(n_i) + k\sigma_i u_i\}} (dissim(x_{Left}, x_{Right}))$$

$$U(n_i, n_j) = \begin{cases} \exp(-\beta \|X_i^{ToF} - X_j^{ToF}\|^2), & \text{if } \|X_i^{ToF} - X_j^{ToF}\| < \tau, n_i \neq n_j \\ 0, & \text{otherwise} \end{cases}$$

$$\beta = \frac{1}{2\langle \|X_i^{ToF} - X_j^{ToF}\|^2 \rangle}$$

where $n_i$ denotes a value of maximum distance multiple of an i-th pixel, $\beta$ is a parameter, j denotes a neighboring pixel of the i-th pixel, $X_i^{ToF}$ denotes a vector of the i-th pixel in the depth image, $C_i(n_i)$ denotes a cost function using a region of the left color image and a region of the right color image, $U(n_i, n_j)$ denotes a cost function using neighboring pixels of a corresponding pixel in the depth image, $\lambda$ denotes a weight value for adjusting a relative significance of $C_i(n_i)$ and $U(n_i, n_j)$, N denotes a collection of all neighboring pixels in the depth image, P denotes a collection of all pixels in the depth image, $\sigma_i$ denotes an error of the i-th pixel, k denotes a confidence interval of a probability distribution, T denotes a threshold for determining similarity between vectors of neighboring pixels in the depth image, and $dissim(X_{Left}, X_{Right})$ denotes a difference in intensity or texture between $X_{Left}$ and $X_{Right}$ corresponding to a point X when projected onto the left color image and the right color image.

16. The synthesis system of claim 12, wherein the at least one processor is configured to estimate intrinsic parameters of the ToF camera and the stereo camera and extrinsic parameters indicating a correlation between the ToF camera and the stereo camera.

17. The synthesis system of claim 12, wherein the at least one processor is configured to,
  analyze each of the left color image and the right color image to identify a distinctive region with a unique dense texture and a flat non-textured region, and to analyze each of the left color image and the right color image to identify a consistent region and an inconsistent region, wherein the consistent region refers to a region existing in two images of the stereo image pair corresponding to the left color image and the right color image, and the inconsistent region refers to a region existing in one image of the stereo image pair,
  estimate, when a region of interest corresponds to a distinctive region and a consistent region, a disparity value per pixel of the distinctive and consistent region by comparing the left color image to the right color image, to estimate, when a region of interest corresponds to a distinctive region and an inconsistent region, a disparity value per pixel of the distinctive and inconsistent region using the reconstructed depth image, and to generate a left disparity image and a right disparity image using the estimated disparity values.

18. The synthesis system of claim 17, wherein the at least one processor is configured to estimate the disparity value per pixel of the distinctive and inconsistent region by projecting a depth per pixel of the reconstructed depth image corresponding to the distinctive and consistent region onto the left color image and the right color image taking the error range per pixel of the reconstructed depth image into consideration, and by estimating, to be a disparity value of a corresponding pixel, a smallest disparity value within a range of projection onto the left color image and the right color image.

19. The synthesis system of claim 17, wherein the at least one processor is configured to analyze each of the left disparity image and the right disparity image to identify a consistent region and an inconsistent region, wherein the consistent region refers to a region existing in two images of the disparity image pair corresponding to the left disparity image and the right disparity image, and the inconsistent region refers to a region existing in one image of the disparity image pair, and to correct the depth of the corresponding region of the reconstructed depth image using a disparity value of the consistent region in the left disparity image and the right disparity image.

20. A method for reliable wide range depth acquisition in a synthesis system of time-of-flight (ToF) camera and stereo camera, the method comprising:
  receiving a depth image of a scene taken with a ToF camera and a left color image and a right color image of the scene taken with a stereo camera;
  estimating an error per pixel of the depth image;
  calculating a value of a maximum distance multiple per pixel of the depth image based on a difference between points projected onto the left color image and the right color image, the points being within an error range corresponding to the error per pixel, the value of the maximum distance multiple being indicative of a distance of an object in the scene with respect to a maximum acquirable distance of the ToF camera; and
  generating a reconstructed depth image by conducting phase unwrapping on the depth image using the value of the maximum distance multiple per pixel of the depth image,
  wherein the estimating of the error per pixel of the depth image includes,
    generating a plane using depths of pixels included in windows of a desired size and calculating a standard deviation using a distance from the plane; and
    estimating, to be the error, a smallest standard deviation among the standard deviations of the windows calculated using the distance from the plane.

* * * * *